US006967228B2

(12) United States Patent  
DeDecker et al.

(10) Patent No.: US 6,967,228 B2  
(45) Date of Patent: Nov. 22, 2005

(54) STABLE FREE RADICAL POLYMERS

(75) Inventors: Mark N. DeDecker, North Canton, OH (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 108 days.

(21) Appl. No.: 10/427,115

(22) Filed: May 1, 2003

(65) Prior Publication Data

US 2004/0220344 A1 Nov. 4, 2004

(51) Int. Cl.⁷ .......................... C08F 293/00; C08F 2/38

(52) U.S. Cl. .................. 525/98; 525/332.7; 525/332.9; 526/220; 526/204; 526/329.1; 526/329.2

(58) Field of Search ................................ 525/98, 332.7, 525/332.9; 526/220, 204, 329.1, 329.2

(56) References Cited

U.S. PATENT DOCUMENTS

| | | | |
|---|---|---|---|
| 5,322,912 A | 6/1994 | Georges et al. | |
| 5,401,804 A | 3/1995 | Georges et al. | |
| 5,549,998 A | 8/1996 | Georges et al. | |
| 5,721,320 A | 2/1998 | Priddy et al. | |
| 6,111,025 A | 8/2000 | Visger et al. | |
| 6,255,402 B1 | 7/2001 | Boutillier et al. | |
| 6,271,308 B1 | 8/2001 | de Boer et al. | |
| 6,353,065 B1 * | 3/2002 | Charleux et al. | ........... 526/220 |
| 6,369,162 B1 | 4/2002 | Visger et al. | |
| 6,420,502 B1 | 7/2002 | Chung | |
| 6,444,754 B1 | 9/2002 | Chin et al. | |
| 6,521,710 B1 | 2/2003 | Roth et al. | |
| 6,525,140 B1 | 2/2003 | Dedecker | |
| 6,525,151 B1 | 2/2003 | Roth et al. | |
| 2003/0050411 A1 | 3/2003 | Gaynor et al. | |
| 2002/0045685 A1 | 4/2003 | Ogoe et al. | |
| 2003/0065097 A1 | 4/2003 | DeGroot et al. | |

FOREIGN PATENT DOCUMENTS

| | | |
|---|---|---|
| FR | 2 768 738 A1 | 3/1999 |
| WO | WO 97/36894 | 10/1997 |
| WO | WO 97/49741 | 12/1997 |
| WO | WO 97/49742 | 12/1997 |
| WO | WO 99/46261 | 9/1999 |
| WO | WO 02/048109 | 6/2002 |

OTHER PUBLICATIONS

Priddy, et al., "Utility/Limitations of Nitroxide Mediated Polymerization for Low Cost Manufacture of Improved Styrenic Polymers", Polymer Preprints (2002, 43(2), 102–103).

Xu, et al., "Boroxyl–Based Living Free Radical Initiators", Polymer Preprints (2002, 43(2, 82–83).

Goplan, et al., "Synthesis of Rod–Coil Diblock Copolymers Via Nitroxide Functionalized Mesogenic Rod Segments", Polymer Preprints (2002, 43(2), 110–111).

Nuyken, et al., "New Concepts for Controlled Radical Polymerization: The DPE–System", Polymer Preprints (2002, 43(2) 84–85).

Cameron, et al., "Butyl Acrylate Polymerization Mediated by a Proxyl Nitroxide", Polymer Preprints (2002, 43(2), 88–89).

Georges, et al., "Stable Free Radical Polymerization Process—Initiation Mechanisms With Benzoyl Peroxide and Various Nitroxides", Polymer Preprints (2002, 43(2), 78–79).

Kobatake, et al., "Block Copolymer Synthesis by Styrene Polymerization Initiated with Nitroxy–Functionalized Polybutadiene", Macromolecules, vol. 31, No. 11, pp. 3735–3739. 1997.

"Nitroxyl Based Controlled Free Radical Polymerization—An Additives Manufacturer's Approach", Pfaendner, et al. Presentation at Commercialization of Controlled Polymer Synthesis, San Francisco, Sep. 16–17, 1999.

"Synthesis of Rod–Coil Diblock Copolymers via Nitroxide Functionalized Mesogenic Rod Segments" by Padma Gopalan, Xuefa Li, Christopher K. Ober and Craig Hawker, Department of Materials Science and Engineering, Cornell University, Ithaca, NY 14852, *Polymer Preprints* 2002, 43 (2), 110.

"Butyl Acrylate Polymerization Mediated by a Proxyl Nitroxide"by Neil R. Cameron and Alistair J. Reid, Department of Chemistry, University of Durham, South Road, Durham, DH1 3LE, U.K., *Polymer Preprints* 2002, 43 (2), 88.

"Stable Free Radical Polymerization Process—Initiation Mechanisms with Benzoyl Peroxide and Various Nitroxides" by Michael K. Georges, Gordon Hamer, Andrea R. Szkurhan, Argang Kazemedah, Joanne Li, Department of Chemistry, University of Toronto, 359 Mississauga Rd. N., Mississauga, On. L5L 1C6, *Polymer Preprints* 2002, 43 (2), 78.

(Continued)

*Primary Examiner*—James J. Seidleck  
*Assistant Examiner*—Olga Asinovsky  
(74) *Attorney, Agent, or Firm*—Ann M. Skerry; Scott A. McCollister

(57) ABSTRACT

A functional polymer having at least one substituent capable of forming a stable free radical is formed by polymerizing a diene monomer, such as butadiene, to form a first polymer block of the functional polymer. The first polymer block has a weight average molecular weight of less than 150,000. A vinyl aromatic monomer, such as styrene, is polymerized to form at least a second polymer block of the functional polymer. The copolymer is contacted with a stable free radical providing compound to form the functional polymer. By adding sufficient vinyl aromatic monomer, a low molecular weight functional rubber polymer can be rendered processable at ambient temperatures, while maintaining a solution viscosity which is suited to subsequent free radical catalyzation of vinyl aromatic monomers.

15 Claims, No Drawings

OTHER PUBLICATIONS

"New Concepts for Controlled Radical Polymerization: The DPE–System" by Oskar Nuyken, Philipp C. Weiland, Yvonne Heischkel and Benedikt Raether, Lehrstuhl für Makromoleculare Stoffe, TU Munchen, D–85747 Garching, Germany, *Polymer Preprints* 2002, 43(2), 84.

"Utility/Limitations of Nitroxide Mediated Polymerization for Low Cost Manufacture of Improved Styrenic Polymers" by Duane B. Priddy and Bob A. Howell, Center for Applications in Polymer Science, Central Michigan University, Mt. Pleasant, MI 48859–0001, *Polymer Preprints* 2002, 43 (2), 102.

"Boroxyl–Based Living Free Radical Initiators" by H. Han, G. Xu, and T. C. Chung, Dept. of Materials Science and Engineering, The Pennsylvania State University, University Park, PA 16082, *Polymer Preprints* 2002, 43 (2), 82.

An article entitled "Nitroxyl Based Controlled Free Radical Polymerization– An Additives Manufacturer's Approach," presentation at "Commercialization of Controlled Polymer Synthesis," San Francisco, Sep. 16–17, 1999 by Rudolf Pfaendner, Wiebke Wunderlich, Michael Roth of Ciba Spezialitatenchemie Lampertheim GmbH, Lampertheim, Germany; Andreas Kramer, Francesco Fuso, Peter Nesvadba of Ciba Specialty Chemicals, Inc. Basel, Switzerland.

An article entitled: "Block Copolymer Synthesis by Styrene Polymerization Initiated with Nitroxy–Functionalized Polybutadiene" by Seiya Kobatake, H. James Harwood and Roderic P. Quirk, Maurice Morton Institute of Polymer Science, The University of Akron, Akron, OH 44325–3909, Duane B. Priddy, Polystyrene R&D, The Dow Chemical Co., Midland, MI 48667; *Macromolecules* preprinted from vol. 31, No. 11, pp. 3735–373, 1998.

An article entitled: "Compatilization of poly(phenylene ether) and polyamide–6,6 blends by functionalized polystyrenes," by Chin, Hui H. Annual Technical Conference—SPE (2002) 60$^{th}$ (Vo 2) 1329–1333, Abstract only.

An article entitled: "Compatibilization of poly(phenylene ether) and polyamide–6,6 blends by functionalized polystyrenes," by Chin, Hui H. Annual Technical Conference—SPE (2002) 60$^{th}$ (Vo 2) 1329–1333, Abstract only.

French Patent No. 2 768 738 dated Sep. 19, 1997 to Boutillier.

PCT International Publication No. WO 97/36894 published Oct. 9, 1997 of International Application No. PCT/US97/05098.

PCT International Publication No. WO 97/49741 published Dec. 31, 1997 of International Application No. PCT/NL97/00352.

PCT International Publication No. WO 97/49742 published Dec. 31, 1997 of International Application No. PCT/NL97/000353.

* cited by examiner

STABLE FREE RADICAL POLYMERS

BACKGROUND OF THE INVENTION

1. Field of the Invention

The invention relates to a method of forming a polymer with a functional group. In particular, it relates to a nitroxy functional polymer containing a low molecular weight polydiene block which is easy to handle at ambient temperatures, and will be described with particular reference thereto.

2. Discussion of the Art

Rubber modified polymers have been produced from vinyl aromatic monomers by a number of processes for the purpose of improving impact resistance. Typically, a rubber is blended with a polymerized vinyl aromatic monomer, or alternatively, the vinyl aromatic monomer is polymerized in the presence of a rubber. In the latter method, the vinyl aromatic monomer is partially graft polymerized onto the rubber. Rubber modified copolymers of vinyl aromatic monomers have also been produced, such as acrylonitrile-butadiene-styrene (ABS). ABS copolymers have been produced using polymerization processes such as bulk-suspension, continuous bulk, and emulsion.

U.S. Pat. No. 5,721,320 discloses a free radical bulk polymerization process for producing a rubber modified polymer from a vinyl aromatic monomer. A conjugated diene rubber, such as polybutadiene, having at least one stable free radical group, such as a nitroxy group, is combined with a vinyl aromatic monomer and optionally a copolymerizable monomer, such as acrylonitrile, under free radical bulk polymerization conditions. The vinyl aromatic monomer polymerizes to form a matrix phase and copolymerizes with the conjugated diene rubber such that a grafted vinyl aromatic-diene block copolymer rubber is formed in situ. It is known to use epoxy-functionalized nitroxyl compounds, as disclosed in U.S. Pat. No. 6,444,754.

However, for some applications, the desired molecular weight of the functionalized polybutadiene is so low that it is impractical to handle at ambient temperatures, due to its viscous state.

The present invention provides a new and improved nitroxy-functional polymer and method of forming, which overcome the above-referenced problems and others.

SUMMARY OF THE INVENTION

In accordance with one aspect of the present invention, a method of forming a functional polymer having at least one stable free radical group is provided. The method includes forming a copolymer including polymerizing a diene monomer to form a first polymer block of the functional polymer. The first polymer block has a weight average molecular weight of less than 150,000. A vinyl aromatic monomer is polymerized to form at least a second polymer block of the functional polymer. The vinyl aromatic monomer is present in sufficient amount to provide the functional polymer with a Mooney viscosity of at least 35 ML(1+4). The method further includes contacting the copolymer with a stable free radical providing compound to form the functional polymer.

In accordance with another aspect of the present invention, a functional polymer is provided. The functional polymer includes a first polymer block comprising diene mer units. The first block has a molecular weight of less than 150,000. The functional polymer includes a second polymer block comprising vinyl aromatic mer units. All vinyl aromatic mer units in the functional polymer comprise from 3–80% by weight of the functional polymer. At least one substituent capable of forming a stable free radical group is bound to at least one of the first or second blocks.

In accordance with another aspect of the present invention, a method of forming a functional polymer having at least one stable free radical group is provided. The method includes forming a copolymer by polymerizing a diene monomer to form a first polymer block of the functional polymer. The first polymer block has a weight average molecular weight of less than 150,000. A vinyl aromatic monomer is polymerized to form at least a second polymer block of the functional polymer. Vinyl aromatic monomers comprise from 3–80% by weight of the monomers employed to form the copolymer. The copolymer is contacted with a stable free radical providing compound to form the functional polymer.

In the context of this invention, the term "polymer" refers to a polymer of any type including homopolymers and copolymers. The term "copolymer" means a polymer derived from two or more different monomers.

"Low molecular weight polydiene" means a diene polymer having a molecular weight of less than about 200,000. Unless otherwise specified, all molecular weights are weight average molecular weights, abbreviated as "Mw". Number average molecular weights are abbreviated "Mn".

Mooney viscosity is measured according to ASTM D-1646. ML (1+4) refers to the Mooney viscosity at 100° C. Unless otherwise specified, Mooney viscosity is ML (1+4).

"Lower alkyl" refers to an alkyl group of 1–7 carbon atoms.

"Functional polymer" refers to a polydiene/poly(vinyl aromatic) copolymer with at least one stable free radical.

"Substituent capable of forming a stable free radical" refers to a substituent which is capable of forming a stable free radical upon activation.

"Mer unit" refers to that portion of a polymer derived from a single reactant molecule; for example, a mer unit from ethylene has the general formula—$CH_2CH_2$—.

DETAILED DESCRIPTION OF THE PREFERRED EMBODIMENT

A functional polymer includes a polydiene/poly(vinyl aromatic) copolymer with at least one substituent capable of forming a stable free radical, such as an epoxy functional substituent with a nitroxyl ether group, which forms a nitroxy free radical upon activation. It is particularly suited to applications in which low molecular weight polydiene rubbers are to be incorporated into other polymers. One use for the functional polymer is in the production of rubber modified polymers from vinyl aromatic monomers formed in situ. The functional polymer will be described with particular reference to polybutadiene as the polydiene component, polystyrene as the poly(vinyl aromatic) component, and nitroxy as the stable free radical group of the functional polymer, although it will be appreciated that the functional polymer may be derived from other diene and vinyl aromatic monomers and radicals, as described in greater detail below.

Low molecular weight polydienes, such as polybutadienes, are very sticky and difficult to handle. It has been found that by adding a polyvinyl aromatic block (polyvinyl arene), such as a polystyrene block, to a low molecular weight polybutadiene, prior to reaction with a chemical compound containing nitroxy functionality, the product is easier to finish and package and yet is able to provide the properties of a nitroxy-functionalized polydiene to a rubber modified polymer. A nitroxy functional rubber of low molecular weight thus is rendered easy to handle at ambient temperatures (20–25° C.) without unduly impacting its solution viscosity. The nitroxy-functional rubber can thus be readily incorporated into vinyl aromatic polymers during mass polymerization of vinyl aromatic monomers. The functional polymer can be in the form of pellets, or other comminuted solids, at ambient temperature, allowing it to be readily shipped.

The functional polymer can be a diblock, triblock, multiblock, radial or star polymer, and can include clean or tapered blocks. The polydiene block or blocks provide the functional polymer with rubbery characteristics while the polyvinyl arene provides some elastomeric character. However, the polyvinyl arene is preferably present at a level at which the rubber character of the copolymer is not lost. Radial block copolymers may be designated $(A-B)_m$-X, wherein X includes a polyfunctional atom or molecule, and in which each $(A-B)_m$- radiates from X in such a way that A is an endblock. In the radial block copolymer, X is a polyfunctional moiety (generally the stable free radical) and m is an integer having the same value as the functional group originally present in X. Thus, in the present invention, the expression "block copolymer" is intended to embrace all block copolymers having such rubbery blocks and thermoplastic blocks as discussed above.

Tapered block copolymers are those in which one or more of the blocks contains both diene and polyvinyl arene monomers, and where the composition of these monomers changes along the length of the block. For example, the tapered block may be pure diene at a first end, the vinyl arene content increasing toward the second end. At the second end, the vinyl arene content may be for example, 30–100%, more preferably 50–100%, with the balance diene. A tapered block of this type may replace one or more of the styrene blocks in a diblock or triblock, with a pure diene or relatively pure diene (95% or more diene) block attached at the first end.

To form the tapered block, a feed of one monomer is reacted with itself to form a first polymer block. The feed is then gradually changed from the first to a second monomer so that a block of a mixture of the two monomers is added to the first block, the concentration of the second monomer increasing towards the end of the second block.

For activation of the substituent on the functional polymer capable of forming a stable free radical to occur, the radical forming atom of the substituent capable of forming a stable free radical is typically bonded to the polydiene block or polyvinyl arene block through an activated carbon. The substituent capable of forming a stable free radical-activated carbon bond is typically stable at temperatures of at least 50° C. An activated carbon atom is defined as a carbon atom which is bonded to at least one unsaturated or aromatic carbon such as those found in alkenyl, cyano, carboxyl, aryl, carboalkoxy (—C(=O)—OR), or carboamine (—C(=O)—NR$_2$) groups. At temperatures above about 60° C., the substituent capable of forming a stable free radical activates to form a stable free radical. For example, a compound containing —C*—O—N< as the stable free radical, wherein the C* atom is activated at temperatures above about 60° C. to form an O—N< and a carbon radical pair. If activation of the substituent capable of forming a stable free radical occurs during the polymerization of a vinyl aromatic monomer, the vinyl aromatic monomer will react with the carbon radical and become inserted between the O of the stable free radical and the activated carbon, resulting in the formation of a vinyl aromatic polymer segment, e.g. —C*-(poly (vinyl aromatic monomer))-O—N<.

Typically, the substituent capable of forming a stable free radical is a nitroxy-functional substituent bonded to the polybutadiene rubber or polystyrene through anionically reactive group which is attached to an activated carbon (e.g., polybutadiene-R—C*—O—N<). Anionically active groups include epoxides, carbonyls, halides, and the like.

Exemplary structures for the functional polymer of the present invention are as follows:

I. PBD-PS-Nitroxy
II. PS-PBD-PS-Nitroxy
III. PS-PBD-Nitroxy
IV. PBD-PS-PBD-PS-Nitroxy
V. PBD-PS-PBD-Nitroxy where PBD represents a polybutadiene block (or any other diene polymer), PS represents a polystyrene block (or any other vinyl aromatic polymer), and nitroxy represents a nitroxy-functional group (or other free radical functionality). Structures I–V may be clean block or tapered block structures. As can be seen, the nitroxy functionality may terminate a polystyrene or a polybutadiene block.

Structures I–V may be used to form ABS polymers, transparent impact [poly]styrene ("TIPS"), and high impact [poly]styrene ("HIPS"). In one embodiment, the polydiene block has a Mw of at least about 10,000, more preferably, at least 20,000, yet more preferably, at least 40,000, yet more preferably, at least 60,000. The polydiene block can have a Mw of up to about 200,000, more preferably, up to 150,000, yet more preferably, up to 100,000. In one embodiment, the Mw of the diene block is such that the functional polymer would not solidify at ambient temperatures (20–25° C.), in the absence of the poly(vinyl aromatic) component. In one embodiment, the polydiene block comprises polybutadiene and the Mw is from 80,000–90,000.

The vinyl arene is preferably present in sufficient amount to cause the functional polymer to be solid enough to be processed and packaged at ambient temperatures, and yet is not present in such an amount that the solution viscosity is outside the range at which the functional polymer is readily incorporated into the monomer mixture in which it is designed to be incorporated. For example, where the monomer mixture is primarily styrene, which is to be polymerized at a temperature of about 70–150° C., the solution viscosity in styrene at 5% and 25° C. is preferably in the range of about 5–50 centipoise (cps), more preferably, about 10–40 cps yet more preferably, about 20–30 cps.

The molecular weight of each poly(vinyl aromatic) block can be from about 3,000 to about 40,000, preferably, less than 20,000. Where there is more than one poly(vinyl aromatic) block, preferably one of the poly(vinyl aromatic) blocks has a Mw of at least 5,000. The Mw of the functional polymer can be less than 200,000, preferably, less than 170,000, more preferably, about 70,000–150,000.

It has unexpectedly been found that the desirable properties of low molecular weight butadiene functional polymers can be retained when styrene is present in sufficient amount to render the functional polymer solid at ambient temperature.

For example, a functional polymer having a butadiene block with a Mw of around 80,000 may have a Mooney viscosity ML(1+4) of about 5 or less. By adding one or more styrene blocks, the Mooney viscosity can be raised to about 75–150. Preferably, the vinyl arene is present in sufficient amount to raise the Mooney viscosity to at least about 35, more preferably, at least 50, yet more preferably, at least 80, yet more preferably, about 100. In one embodiment, the Mooney viscosity of the functional polymer is below about 170, more preferably, below about 150, to ensure that the solution viscosity remains within a desired range.

The vinyl aromatic can constitute up to about 80% by weight, of the total weight of polyvinyl aromatic block(s) and polydiene block(s) in the functional polymer, more preferably, less than about 70 wt % of the total, most preferably, less than 50 wt % of the total. The vinyl aromatic can be at least about 2% by weight, more preferably, at least 3 wt %, yet more preferably, at least 5 wt % of the total weight of polyvinyl aromatic block(s) and polydiene block(s) in the functional polymer. The polydiene content can be at least about 20 wt % by weight, more preferably, at least about 30 wt %, most preferably, at least 50 wt % of the total weight of polyvinyl aromatic block(s) and polydiene block(s) in the functional polymer. The polydiene content can be up to about 98% by weight, more preferably, less than 97 wt %, yet more preferably, less than 95 wt %.

In one embodiment, where the functional polymer has a butadiene block with a Mw of around 80,000, the vinyl aromatic content is preferably less than about 10 wt % of the total weight of the functional polymer. In this embodiment, the polydiene content is preferably at least about 90%.

In another embodiment, which is particularly suited to diblock functional polymers in which the vinyl aromatic portion is primarily (i.e., at least 90% in the form of a single block (which may be a clean or a tapered block), the vinyl aromatic block content is from about 3 to about 40% by weight, more preferably from 5–25% by weight, yet more preferably, from 10–15% by weight of the total weight of the functional polymer.

For example, a diblock which is solid at ambient temperatures may be formed with a butadiene block having a Mw from 60,000 to 100,000, more preferably 80,000–90,000 and a styrene block having a Mw of from 10,000–30,000, more preferably, about 10–20,000.

In another embodiment, which is particularly suited to triblock functional polymers in which at least two styrene containing blocks are present (which may be clean or tapered blocks), the vinyl aromatic block(s) content of the total is from 30 to about 70% by weight, more preferably, about 40–60% by weight, most preferably, less than 50% by weight. The polydiene content, in this embodiment, is from 30 to about 70% by weight, more preferably about 40–60% by weight, most preferably, at least 50% by weight.

The functional polymer of the present invention can be prepared from a diene monomer component, a vinyl arene component, and a stable free radical component. Typically, a diene monomer and a vinyl arene monomer are polymerized under anionic or free radical polymerization conditions in the absence of the stable free radical component. The stable free radical component is then used to terminate the live end of the resulting block copolymer.

The Diene Monomer

Suitable monomers for forming the polydiene component of the functional polymer include dienes, preferably conjugated dienes containing from 4 to 20 carbon atoms. Exemplary diene monomers include 1,3-conjugated dienes, such as butadiene, 2-methyl-1,3-butadiene (isoprene), piperylene, 2,3-dimethyl-1,3-butadiene, 1,3-pentadiene, 1,3-hexadiene, chloroprene, and mixtures thereof, and the like. Most preferably, the diene monomer component is 1,3-butadiene. For example, the polydiene block(s) may be derived from randomly copolymerized butadiene and isoprene, or one or more blocks of each of butadiene and isoprene, although it is generally the case that the polydiene block(s) in the functional polymer are homopolymer blocks.

The Vinyl Aromatic Monomer

Suitable vinyl aromatic monomers for forming the poly (vinyl arene) component of the functional polymer are of the general formula:

wherein R is hydrogen or alkyl, Ar is an aromatic ring structure having from 1 to 3 aromatic rings with or without alkyl, halo, or haloalkyl substitution, wherein any alkyl group contains 1 to 6 carbon atoms, which may be mono- or multi-substituted with functional groups such as halo, nitro, amino, hydroxy, cyano, carbonyl and carboxyl. In one embodiment, Ar is phenyl or alkylphenyl, halophenyl, alkylphenyl, alkylhalophenyl, naphthyl, pyridinyl, or anthracenyl. The vinyl substituted aromatics generally contain from 8 to about 20 carbons, preferably from 8 to 12 carbon atoms and most preferably, 8 or 9 carbon atoms.

More preferably, Ar is phenyl or alkyl phenyl with phenyl being most preferred. Typical vinyl aromatic monomers include styrene, alpha-lower alkyl substituted styrenes, for example, α-methylstyrene and α-ethyl styrene, styrenes having ring substituents, preferably, lower alkyl ring substituents, for example, o-methyl styrene, m-methyl styrene, p-methyl styrene, and p-tert-butylstyrene, vinyl benzene sulfonic acid, and p-lower alkoxy styrene, 1,3, dimethyl styrene, all isomers of vinyl toluene, especially p-vinyltoluene, all isomers of ethyl styrene, propyl styrene, butyl styrene, vinyl biphenyl, vinyl naphthalene, vinyl anthracene, vinyl substituted aromatics including substituted vinyl anthracenes, substituted vinyl naphthalenes and substituted vinyl benzenes (styrenes) including substituted styrenes, and the like. Substituted styrenes include styrenes that have substituents on the ring or on the vinyl group. Such substituents include halo-, amino-, alkoxy-, carboxy-, hydroxy-, sulfonyl-, hydrocarbyl- wherein the hydrocarbyl group has from 1 to about 12 carbon atoms, and other substituents. Mixtures of two or more vinyl aromatic monomers can be used. Styrene and substituted styrenes are preferred. Styrene is the most preferred. For example, the vinyl arene block(s) may be derived from randomly copolymerized styrene and α-methyl styrene, although the blocks are generally homopolymer blocks. Where more than one polyvinyl arene block is present, the blocks may be derived from the same or different monomer(s).

The Stable Free Radical

The stable free radical component is a compound capable of forming a stable free radical which will react with the living polydiene/poly (vinyl aromatic) copolymer, typically via a living vinyl aromatic or living diene mer unit of the copolymer. The stable free radical component can be a molecule which is storage stable in pure form, i.e. nonreactive with itself at temperatures of up to 120° C., a compound derived therefrom, or any compound which will react with the copolymer and contains a group capable of producing a stable free radical. In one embodiment, the stable free radical component comprises an initiator.

Typical stable nitroxy radicals are those having the general formula:

where $R_1$ and $R_2$ are tertiary alkyl groups, or where $R_1$ and $R_2$ together with the N atom form a cyclic structure, preferably having tertiary branching at the positions alpha to the N atom. Examples of hindered nitroxy radicals include 2,2,5,5-tetraalkylpyrrolidinoxyl radicals, as well as those in which the 5-membered heterocyclic ring is fused to an alicyclic or aromatic ring, hindered aliphatic dialkylaminoxyl and iminoxyl radicals such as $(R_3C)_2$ N—O. and $R_2$C=N—O., diarylaminoxyl and aryl-alkylaminoxyl radicals such as the nitroxyl radical from alkyl diphenylamine, $(R—Ar)_2$ N—O., nitroxyl derivatives of dihydroquinoline light stabilizers and antiozonants (available from Ciba-Geigy), in monomeric and polymeric forms, and nitroxyl radicals derived from dibenzo-heterocyclics, such as phenothiazines and phenoxazines. Examples include 2,2,6,6-substituted 1-piperidinyloxy radicals and 2,2,5,5-substituted 1-pyrrolidinyloxy radicals. Suitable as the substituent are alkyl groups containing not more than four carbon atoms, such as methyl and ethyl. Specific examples include 2,2,6,6-tetramethyl-1-piperidinyloxy (TEMPO) radical, which is available from Aldrich Chemical Company, 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylaminoxy radical.

Nitroxyl ethers of the general formula shown below are preferred compounds for forming a stable nitroxy free radical.

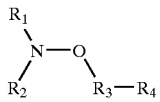

Generic Nitroxyl Ether Structure where $R_1$ and $R_2$ independently are tertiary alkyl groups, or where $R_1$ and $R_2$ together with the N atom form a cyclic structure, preferably having tertiary branching at the positions alpha to the N atom. Together with the N—O, these groups provide a TEMPO-type structure which will result in a stable free radical. $R_3$ is a group which will provide an activated carbon which will result in a good leaving group for the stable free radical. Examples of suitable $R_3$ groups include compounds attached through a tertiary carbon, or a secondary carbon with an aryl group attached. $R_4$ is an attaching group which will provide a site for attachment to a living polymer end. Examples of good attaching groups include epoxide, halide, carbonyl, and ester groups. Particularly preferred nitroxyl ethers are those having an epoxide attaching group.

Nitroxyl ethers, such as nitroxy glycidyl ethers of the type disclosed in U.S. Pat. No. 6,444,754, which is incorporated herein by reference, may also be used. Glycidyl or carbonylfunctional N-alkoxy-4,4-dioxy-polyalkyl-piperidine nitroxide initiators of the type disclosed in WO 2002/048109 and WO 99/46261 are also suitable. Examples of these initiators include 2,2,6,6-tetraalkylpiperidines which are derivatives of 2,2,6,6 tetramethyl piperidine, 2,2 diethyl-6,6 dimethylpiperidine and of 2,6-diethyl-2,3,6-trimethyl piperidine which are substituted in the 4 position by two oxygen atoms forming an open chain or cyclic ketal structure. The ketal structure in 4 position ensures high thermal stability which is important for storage, particularly at elevated temperatures. The ketal structure is thermally significantly more stable compared to the corresponding 4-oxo compound. The compounds exhibit an unchanged initiating/regulating activity even after storage at elevated temperatures.

Examples of such structures include: 4,4-dibutoxy-2,6-diethyl-2,3,6-trimethyl-1-[1-(4-oxiranylmethoxy-phenyl)-ethoxy]-piperidine; 7,9-diethyl-6,7,9-trimethyl-8-[1-(4-oxiranylmethoxy-phenyl)-ethoxy]-1,4-dioxa-8-aza-spiro[4.5]decane; 8,10-diethyl-3,3,7,8,10-pentamethyl-9-[1-(4-oxiranylmethoxy-phenyl)-ethoxy]-1,5-dioxa-9-aza-spiro[5.5]undecane; {8,10-diethyl-3,7,8,10-tetramethyl-9-[1-(4-oxiranylmethoxy-phenyl)-ethoxy]-1,5-dioxa-9-aza-spiro[5.5]undec-3-yl}-methanol; {3,8,10-triethyl-7,8,10-trimethyl-9-[1-(4-oxiranylmethoxy-phenyl)-ethoxy]-1,5-dioxa-9-aza-spiro[5.5]undec-3-yl}-methanol; 4,4-dibutoxy-2,2-diethyl-6,6-dimethyl-1-[1-(4-oxiranylmethoxy-phenyl)-ethoxy]-piperidine; 7,7-diethyl-9,9-dimethyl-8-[1-(4-oxiranylmethoxy-phenyl)-ethoxy]-1,4-dioxa-8-aza spiro[4.5]decane; 8,8-diethyl-3,3,10,10-tetramethyl-9-[1-(4-oxiranylmethoxy-phenyl)-ethoxy]-1,5-dioxa-9-aza-spiro[5.5]undecane; {8,8-diethyl-3,10,10-trimethyl-9-[1-(4-oxiranylmethoxy-phenyl)-ethoxy]-1,5-dioxa-9-aza-spiro[5.5]undec-3-yl}-methanol; {3,8,8-triethyl-10,10-dimethyl-9-[1-(4-oxiranylmethoxy-phenyl)-ethoxy]-1,5-dioxa-9-aza-spiro[5.5]undec-3-yl}-methanol; 4,4-dibutoxy-2,2,6,6-tetramethyl-1-[1-(4-oxiranylmethoxy-phenyl)-ethoxy]-piperidine; 7,7,9,9-tetramethyl-8-[1-(4-oxiranylmethoxy-phenyl)-ethoxy]-1,4-dioxa-8-aza-spiro[4.5]decane; 3,3,8,8,10,10-hexamethyl-9-[1-(4-oxiranylmethoxy-phenyl)-ethoxy]-1,5-dioxa-9-aza-spiro[5.5]undecane; and combinations thereof.

Particularly preferred are compounds which include a 1-(4-oxiranylmethoxy-phenyl)-ethoxy attached to the nitrogen, such as 3,3,8,8,10,10-hexamethyl-9-[1-(4-oxyranylmethoxy-phenyl)-ethoxy]-1,5-dioxa-9-aza-spiro[5.5]undecan, which is disclosed in WO 02/048109 and which has the following structure A:

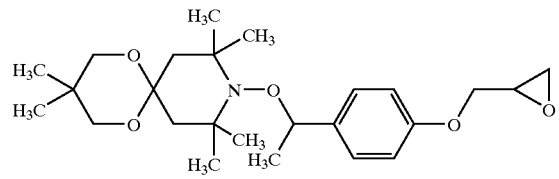

2,2,6,6-tetramethyl-1-[1-(4-oxiranylmethoxy-phenyl)-ethoxy]-4-propoxy-piperidine, which is disclosed in WO 99/46261 has the following structure B:

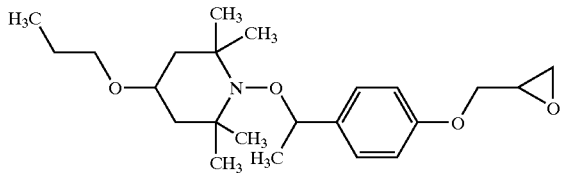

and 2,2,6,6-tetramethyl-1-[1-(4-(oxiranylmethoxy)-phenyl)-ethoxy]-piperidine, disclosed in WO 99/46261, which has the structure C:

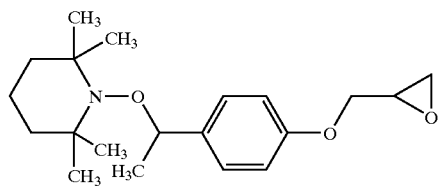

Such structures have several characteristics which render them particularly suited to the present application. First, each has a nitroxyl ether structure which allows it to become a stable free radical at elevated temperatures. Second, the compound has an active carbon attached to the N—O to provide a good leaving group within the compound structure. Third, the compound has an epoxide group, allowing it to react with a living anionic polymer. This provides a strong bond with the anionic polymer.

Another useful compound is 2,2,6,6-tetramethyl-1-(2-glycidyloxy-1-phenylethoxy)piperidine. Other suitable nitroxy free radicals are described in U.S. Pat. Nos. 6,521,710 and 6,525,151, which are incorporated herein by reference. Exemplary among these are the structures listed at column 19, line 10, to column 20, line 23 of the '710 patent, in particular, those having a >C═O group.

Exemplary nitroxyl ethers which are available include CGX-PR-298, CGX PR-299, CGX PR-913, and CGX PR-1399, obtained from Ciba Specialty Chemicals Corp. Tarrytown N.Y.

Other stable free radicals, such as galvinoxyl free radical, boroxyl compounds, and alkylperoxydiarylborane compounds, as disclosed in U.S. Pat. No. 6,420,502, which is incorporated herein by reference, may also be used in lieu of the nitroxy free radical.

Other examples of compounds which contain nitroxy stable free radical groups include: chain transfer agents, terminating agents, initiators and comonomers of the type disclosed in U.S. Pat. No. 5,721,320, which is incorporated herein by reference.

The amount of stable free radical agent employed in the functionalization of the polydiene/vinyl arene copolymer is typically in an approximately equimolar ratio with the initiator (e.g., butyl lithium). For example, about 0.7–1.5 mol free radical: 1 mol initiator is used, more preferably, about 0.8–1.1 mol free radical to 1 mol initiator. In this way, there is sufficient stable radical to terminate each live terminal of the polydiene/polyvinyl arene copolymer.

Preferably, the stable free radical component comprises 10% or less of contaminants, by weight, more preferably, less than 5%, most preferably, less than 1%.

Nitroxy containing compounds can be prepared from the desired precursors, by forming carbon centered radicals in the presence of a nitroxy containing compound which traps the carbon centered radical intermediates as they form. Methods of making carbon centered radicals are well known in the art and include techniques such as 1) H-abstraction from activated hydrogen compounds; 2) radical addition to activated double bonds; 3) electron transfer; and 4) thermolysis of an activated azo compound; 4) reacting an alcohol containing a nitroxy group with a sulfonic acid halide, e.g., tosyl chloride, and polybutadienyllithium; 5) reacting an alcohol containing a nitroxy group with a haloalkylstyrene, e.g. p-chloromethylstyrene, all of which techniques are discussed in U.S. Pat. No. 5,721,320.

Formation of the Functional Polymer

Methods of polymerizing dienes and vinyl aromatic compounds in the presence of chain transfer agents, initiators, and/or comonomers are well known in the art and any method may be utilized in preparing the block copolymers used in the process of the present invention. The polybutadiene/polystyrene copolymer containing a nitroxyl substituent capable of forming a stable free radical can be prepared, for example, by anionically polymerizing butadiene and styrene in the presence of an initiator, such as an alkyl lithium, e.g., butyl lithium.

For example, to form a PBD/PS-nitroxy functional polymer, a charge of a first monomer, such as butadiene or styrene, is polymerized in a reactor in the presence of an anionic initiator in a suitable solvent at a suitable reaction temperature, to form a first block. The first block is a living polymer, capable of undergoing further reaction. A charge of a second monomer is introduced to the reactor and allowed to copolymerize with the first block at a suitable reaction temperature to form a diblock. The first monomer is either a diene or a vinyl arene, and the second monomer is the other of the diene and vinyl arene. The diblock is a living polymer, capable of undergoing further reaction with the nitroxy compound via the live end of the second block. It will be appreciated that further charges of monomer may be added to form triblock or multiblock living polymers.

Suitable solvents include normally liquid organic materials which form a solution with the monomers, copolymers, and functional polymer. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. One or more solvents can be used. Preferred solvents include hexane and cyclohexane.

A 1,2-microstructure controlling agent or randomizing modifier can be used during formation of the polymer blocks to control the 1,2-microstructure in the diene contributed units and to randomize the amount of vinyl aromatic monomers, such as styrene, incorporated with the diene monomer, such as butadiene, in the rubbery phase. Suitable modifiers include, but are not limited to, tetramethylenediamine (TMEDA), oligomeric oxolanyl propanes (OOPS), 2,2-bis-(4-methyl dioxane)(BMD), tetrahydrofuran (THF), bistetrahydrofuryl propane and the like. One or more randomizing, modifiers can be used. The amount of the modifier to the weight of the monomers in the reactor can vary from a minimum as low as 0 to a maximum as great as 400 millimoles, preferably 0.01 to 300.0 millimoles, of modifier per hundred grams of monomer currently charged into the reactor. As the modifier charge increases, the percentage of 1,2-microstructure increases in the diene monomer contributed units. A polar organic compound such a ether, polyether, tertiary amine, polyamine, thioether and hexamethylphosphortriamide may be used to control the vinyl linkage content in the conjugated diene component. The vinyl linkage content can be controlled by the amount added of the polar organic compound, and by the polymerization temperature.

Once the block copolymer is formed, the living end is terminated with the stable radical by adding the nitroxy compound to the reactor. The resultant functional polymer can be removed from the reactor and dried to remove the solvent, for example by drum drying or steam desolventizing and processed, e.g., by milling, grinding, pelletizing, or the like for later use.

In some circumstances, where one of the polymers to be formed is insoluble or only sparingly soluble in the selected solvent (e.g., [poly]styrene in hexane) a small amount of the other monomer, e.g., butadiene, can be copolymerized first to form a solution in which the polystyrene polymer is soluble or dispersed and can be readily polymerized. Typically less than 10% of the total weight of monomers, more preferably, about 5% by weight of the total monomers (e.g., butadiene monomer) is used to form this first solubilizing block, such that the character of the copolymer is primarily defined by the subsequently added blocks in the copolymer. For example, a copolymer comprising a solubilizing block of about 5 wt % butadiene, a midblock comprising about 25 wt % styrene, and an endblock comprising about 70 wt % butadiene with a living end capped by a nitroxy stable radical has essentially the same character as the diblock PS-PBD-Nitroxy of structure III, discussed above.

In cases where the nitroxyl ether compound is to be bonded to a butadiene block and is one which does not readily react with butadiene, a group containing an activated carbon can be added by reacting the lithium terminated polybutadiene with a small amount of styrene monomer, such that an oligomer having an end group containing an activated carbon atom, e.g. a secondary benzylic carbon, is attached to the polybutadiene block. The polybutadiene-styrene oligomer is then reacted with a nitroxy stable free radical component, such as 2,2,6,6-tetramethylpiperidinyl-1-oxy (TEMPO), to produce a copolymer in which the polybutadiene block is bonded to the nitroxyl ether stable free radical through an activated carbon atom. The amount of styrene used in this step is much less than is required to modify the Mooney viscosity of the resulting polymer, as described above. Typically, the amount of styrene used to provide the active carbon is about 1% or less by weight, based on the total weight of monomers (i.e., sufficient to provide about 1 to 10 styrene mer units).

More preferably, the nitroxyl ether compound is one which is capable of reacting directly with the living end of the butadiene block. Preferred nitroxyl ether compounds capable of direct reaction include nitroxyl ethers of the type discussed above. The epoxy group is used as a terminator for the polybutadiene/styrene copolymer prepared by anionic polymerization. The resultant functional polymer preferably contains one substituent capable of forming a stable free radical on one or both chain ends. It is also contemplated that additional free radical groups, which are pendant from the polymer chain, may be provided.

In one embodiment, the functional polymer is solid at room temperature and can be formed into pellets or otherwise comminuted for shipping. To achieve this, the vinyl aromatic monomers preferably comprise from 3–80% by weight of the monomers employed to form the copolymer, with each vinyl aromatic block comprising less than 40% by weight of the functional polymer, thereby retaining the rubber character of the functional polymer. By adding sufficient vinyl aromatic monomer, a low molecular weight functional rubber polymer can be rendered processable at ambient temperatures, while maintaining a solution viscosity which is suited to subsequent free radical catalyzation of vinyl aromatic monomers. For example, the nitroxyl ether-functional polymer can be used as a macroinitiator in the formation of styrene-butadiene block copolymers.

Use of the Functional Polymer in Free Radical Catalyzed Reactions

In one embodiment of the present invention, the functional polymer is used in a free radical catalyzed reaction of a vinyl aromatic monomer to produce a rubber-modified vinyl aromatic polymer in which a portion of the vinyl aromatic monomer copolymerizes with the functional polymer. For example, styrene-butadiene-styrene copolymer rubber is produced in situ by polymerizing styrene monomer in the presence of a polybutadiene/polystyrene copolymer containing a nitroxyl substituent capable of forming a stable free radical, to produce a rubber modified polystyrene.

The rubber reinforced polymer can be prepared by dissolving the functional polymer in a solution containing the vinyl aromatic monomer and polymerizing the rubber/monomer mixture. This process can be conducted using conventional techniques known in the art for preparing rubber reinforced polymers such as high impact polystyrene (HIPS) and ABS, which are described in U.S. Pat. Nos. 2,646,418, 4,311,819, 4,409,369, and 5,721,320. Suitable vinyl aromatic monomers include those listed above.

The amount of the functional polymer added to the vinyl aromatic monomer is typically such as will provide a polydiene content from about 3 to about 20 percent, preferably from about 5 to about 17 percent and more preferably from about 7 to about 12 percent based on the total weight of the vinyl aromatic monomer and the functional polymer. The amount of functional polymer added thus depends on the percentage of polyvinyl arene in the functional polymer.

Initiators may also be used in the polymerization of the functional polymer/monomer mixture. Useful initiators include free radical initiators such as peroxide and azo compounds which will accelerate the polymerization of the vinyl aromatic monomer. Suitable initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the process of the present invention.

Initiators may be employed in a range of concentrations dependent on a variety of factors, including the specific initiators employed, the desired levels of polymer grafting, and the conditions at which the mass polymerization is conducted. Typically from 50 to 2000, preferably from 100 to 1500, parts by weight of the initiator are employed per million parts by weight of monomer.

Additionally, a solvent may be used in the polymerization of the functional polymer/monomer mixture. Acceptable solvents include normally liquid organic materials which form a solution with the functional polymer, vinyl aromatic monomer, and the polymer prepared therefrom. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene and xylene being most preferred. In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to about 35 weight percent, preferably from about 2 to about 25 weight percent, based on the total weight of the solution.

The vinyl aromatic monomers may also be combined with one or more other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, maleic anhydride, and combinations thereof.

Examples of useful acrylic monomers include acrylic acid, methacrylic acid, esters thereof, including lower alkyl esters, fatty esters, and mixed esters, such as $C_{8-10}$ alkyl esters and $C_{12-15}$ alkyl esters, acrylamide, methacrylamide, and N- and N,N- substituted acrylamides and the corresponding methacrylamides, acrylonitrile and methacrylonitrile.

Other materials may also be present in the polymerization of the functional polymer/monomer mixture, including plasticizers, e.g. mineral oil; flow promoters, lubricants, antioxidants, e.g. alkylated phenols such as di-tertbutyl-p-cresol or phosphites such as trisnonyl phenyl phosphite; catalysts, e.g. acidic compounds such as camphorsulfonic acid or 2-sulfoethylmethacrylate; mold release agents, e.g. zinc stearate, or polymerization aids, e.g. chain transfer agents such as an alkyl mercaptan, e.g. n-dodecyl mercaptan If employed, the chain transfer agent is generally employed in an amount of from about 0.001 to about 0.5 weight percent based on the total weight of the polymerization mixture to which it is added.

During the polymerization of the functional polymer/monomer mixture, the vinyl aromatic monomer polymerizes to form a matrix phase and grafts onto the functional polymer.

The process of the present invention is particularly useful in preparing high impact polystyrene and acrylonitrile-butadiene-styrene polymers wherein the functional polymer is typically dispersed throughout the polystyrene or polystyrene-acrylonitrile matrix phase.

In one specific embodiment of the present invention, ABS is made by copolymerizing styrene and acrylonitrile in the presence of a nitroxy terminated polybutadiene/styrene copolymer, such that butadiene-SAN block copolymers are prepared in situ during the styrene and acrylonitrile copolymerization.

Additionally, the process of the present invention can be used to produce transparent rubber reinforced polymers. A PS-PBD-PS-nitroxy functional polymer in which the polybutadiene block has a Mw of about 5000–90,000, e.g., 5000–50,000 and the two styrene blocks have an Mw of about 5000–90,000, e.g., 5000–80,000 is particularly effective for this purpose. In one particular embodiment, each styrene block has a molecular weight of 70,000, or less, and the butadiene block has a molecular weight of 40,000, or less.

In another embodiment, the functional polymer includes a first styrene block having an Mw of about 11,000, followed by a polybutadiene block of Mw about 5000–15,000, then ended by a tapered block comprising both butadiene and styrene and having an Mw which brings the total Mw of the blocks to about 80,000.

The following examples are provided to illustrate the present invention. The examples are not intended to limit the scope of the present invention and they should not be so interpreted. Amounts are in weight parts or weight percentages unless otherwise indicated.

EXAMPLES

A 38 liter (10 gallon) reactor equipped with external jacket heating and internal agitation was used for the polymerizations of Examples 1–6. Prior to addition of reactants, the reactor was vented to less than about 0.7 Kg/cm$^2$ (10 psig). In Example 7, a 450 liter reactor was used.

Example 1

Preparation of a Type III Functional Polymer in Hexane Solvent

A charge of hexane solvent at 64.9 parts per hundred parts of monomer (PHM) was added and the reactor vented to less than about 0.7 Kg/cm$^2$ (10 psig). A charge of butadiene in hexane solvent (22% butadiene) at 5.0 PHM butadiene was introduced to the reactor and stabilized at a temperature of about 43° C. A charge of butyl lithium initiator in hexane solvent (0.0960 PHM of butyl lithium) was added and the temperature of the jacket was raised to 60° C. to initiate polymerization of the butadiene. The temperature of the jacket is controlled externally to add heat to the reactor to accelerate the reaction. When the temperature had peaked, indicating conversion was complete, a charge of 33% styrene in hexane was added to the reactor (25 PHM styrene) and the reaction was allowed to peak again. A second charge of the butadiene in hexane was then added to the reactor (70 PHM butadiene). Once the reaction was complete, a nitroxyl ether stable radical compound, as shown in Structure B (0.497 PHM) was added and stirred for 15 mins. to form a functional polymer (cement). The functional polymer was dropped from the reactor into two pails and antioxidants, Irganox 1076 (Ciba Geigy) (at 0.2 PHM) and Irganox 1520 (Ciba Geigy) (at 0.1 PHM), added to the cement in each pail.

After drying, the resulting functional polymer had a Mooney Viscosity ML (1+4) of 133.4, a Mw of 140,441, Mn of 83,746, with a polydispersity (Mw/Mn) of 1.68. Mn and Mw were measured by GPC throughout.

Example 2

Preparation of a Type III Functional Polymer in Cyclohexane

The reactor was charged with cyclohexane (273 PHM) and then 33% styrene in hexane (25 PHM styrene) and stabilized at a temperature of about 60° C. A charge of 3% butyl lithium initiator in cyclohexane solvent (0.1100 PHM butyl lithium) was added and 15% bis-oxalanyl propane (OOPS, Aldrich) in hexane (0.0080 PHM OOPS) was added as an activator. When the temperature had peaked, indicating conversion was complete, a charge of 22% butadiene in cyclohexane was metered in to the reactor (75 PHM butadiene) and the reaction was allowed to peak again. Once the reaction was complete, a nitroxyl ether stable radical compound, as shown in structure B (0.567 PHM) was added and stirred for 15 mins. to form a functional polymer (cement). The functional polymer was dropped from the reactor into pails and an antioxidant, Irganox 1520L (Ciba Geigy) added to the cement (at 0.1 PHM)

After drying, the resulting functional polymer had the properties shown in Table 1 below.

TABLE 1

| Component | Example 2 | Example 3 |
|---|---|---|
| Mn | 89659 | 88195 |
| Mw | 103646 | 104030 |
| % cis | 37.8 | 40.2 |
| % trans | 49.3 | 51.4 |
| % vinyl | 13.0 | 8.4 |
| solution viscosity (toluene) | 12.1 | 11.8 |
| % bound styrene | 26.7 | 28.8 |
| Mooney ML (1 + 4) | >140 | >140 |

Example 3

Preparation of a Type III Functional Polymer in Cyclohexane

The reactor was charged with cyclohexane (273 PHM) and then 33% styrene in hexane (25 PHM styrene) and stabilized at a temperature of about 60° C. A charge of 3% butyl lithium initiator in cyclohexane solvent (0.1200 PHM butyl lithium) was added. When the temperature had peaked, indicating conversion was complete, a charge of 22% butadiene in cyclohexane was metered in to the reactor (75 PHM butadiene) and the reaction allowed to peak again. Once the reaction was complete, a nitroxy ether stable radical compound, as shown in Structure B (0.619 PHM) was added and stirred for 15 mins. to form a functional polymer (cement). The functional polymer was dropped from the reactor into pails and antioxidants, Irganox 1076L (Ciba Geigy) (at 0.2 PHM) and Irganox 1520L (Ciba Geigy) (at 0.1 PHM) added to the cement. After drying, the clear product had the properties shown in Table 1.

Example 4

Preparation of a Type II Functional Polymer in Cyclohexane with a Tapered block Triblock Structure The reactor was charged with cyclohexane (170.5 phm) and then heated to 95° C. The reactor was then vented to remove any moisture in the cyclohexane as an azeotropic mixture. The reactor contents were then cooled to 38° C. A charge of 33% styrene in hexane was charged into the reactor (14 PHM styrene), then n-butyl lithium was added (0.08 phm) followed by 0.006 phm of bis-oxalanyl propane @ 15% in hexane. The batch was allowed to peak. After the peak, the jacket temperature was set to 77° C. and a 22% mixture of butadiene in hexane (50.5 phm butadiene) was metered in at over the course of 40 minutes. After 3 minutes of metering the butadiene, metering of 33% styrene in hexane was started (35.5 phm) with a rate to last for 37 minutes. After the peak, 0.413 phm of a stable free radical component as shown in Structure B was added.

A sample of this batch was dried and resulted in a Mooney ML (1+4) of 28.8, a solution viscosity of 7.2, Mn of 90,820 and Mw of 104,204. To raise the Mooney viscosity of this sample, it was blended with other batches of functional polymer to provide a blend having a Mooney viscosity of 50–60 ML (1+4).

Example 5

Preparation of a Type I Functional Polymer in Hexane

The reactor was charged with hexane (133.7 PHM) and then 22% butadiene in hexane (85 PHM butadiene) and stabilized at a temperature of about 27° C. A charge of 3% butyl lithium initiator in hexane solvent (0.0582 PHM butyl lithium) was added. When the temperature had peaked, indicating conversion was complete, a charge of 33% styrene in hexane was metered in to the reactor (15 PHM styrene) and the reaction was allowed to peak again. Once the reaction was complete, a nitroxyl ether stable radical compound having the formula of Structure C above (0.329 PHM) was added and stirred for 15 mins. to form a functional polymer. The functional polymer was dropped from the reactor into pails and antioxidants, Irganox 1076 (Ciba Geigy) (at 0.2 PHM) and Irganox 1520L (Ciba Geigy) (at 0.08 PHM), and EHA (ethylhexanoic acid) (at 0.125 PHM) added to the cement.

After drum drying, the resulting functional polymer had a Mooney viscosity of 133.3, Mn of 117,972, Mw of 134,408, and a solution viscosity (in toluene) of 25.5. The % cis was 41.7, % trans was 50.9, % vinyl was 7.4, and bound styrene was 13.6%.

Example 6

Preparation of a Type I Functional Polymer in Hexane

Example 5 was repeated. After drum drying, the resulting functional polymer had a Mooney viscosity of 146.6, Mn of 113,610, Mw of 118,305, and a solution viscosity (in toluene) of 28.9, % cis was 41.7, % trans was 50.9, % vinyl was 7.4, and bound styrene was 12.6%.

Example 7

Preparation of a Type I Functional Polymer in Hexane

Hexane was charged to the reactor (279.5 phm) followed by 22% butadiene in hexane (85 phm butadiene). The temperature was stabilized to 22° C. Then n-butyl lithium was charged (0.0656 phm) and the batch was allowed to peak. After the peak, 33% styrene in hexane was charged (15 phm styrene) over a 24 minute period. After the styrene addition was completed, an additional 3 phm of butadiene (22% in hexane) was added. After the necessary reaction time to achieve essentially complete conversion of the monomers, a nitroxy-functional ether, as shown in Structure A was charged in a 2% solution in cyclohexane (0.422 phm). After 20 minutes, 0.142 phm of EHA was added. The batch was transferred to drums and Irganox 1076 (0.2 phm) and Irganox 1520L (0.08 phm) were added.

The final sample results were Mooney ML (1+4) 102.1, Mn 99752, Mw 104362, solution viscosity 22.4, and bound styrene 11.7%.

Example 8

Preparation of a Continuous Polymerization Version of a Type I Polymer

A type I polymer was produced using a continuous polymerization system. Hexane, butadiene (85 phm butadiene), OOPs (0.007 phm and n-butyl lithium (0.085 phm) were metered into a first reactor with a volume of 190 liters. The exothermic reaction in the first reactor raised the temperature from ambient (25° C.) to about 100° C. accomplishing essentially complete conversion of the butadiene to polybutadiene. The reacted mixture is introduced into a second reactor of 190 liters volume. A 33% styrene in hexane (15 phm styrene) solution is added the second reactor and is reacted to greater than 98% conversion. The reacted solution is directed into a third mixing vessel of 75 liters volume, into which a compound as shown in structure C is added at 0.308 phm. The nitroxy functional polymer cement is collected in a storage vessel for a four hour period. The stabilizers EHA (0.173 phm), Irganox 1076 (0.2 phm) and Irganox 1520L (0.08 phm are added to the storage vessel prior to drying the sample. The final properties of the sample were Mooney ML (1+4) 82.9, Mn 76,900, Mw 145,570, and solution viscosity 28.8 cPs.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of forming a functional polymer having at least one substituent capable of forming a stable free radical comprising:
   forming a copolymer including:
   polymerizing a diene monomer to form a first polymer block of the functional polymer, the first polymer block having a weight average molecular weight of less than 150,000;

polymerizing a vinyl aromatic monomer to form at least a second polymer block of the functional polymer, the vinyl aromatic monomer being present in sufficient amount to provide the functional polymer with a Mooney viscosity of at least 35 ML(1+4); and after polymerizing the diene monomer and polymerizing the vinyl aromatic monomer, contacting the copolymer with a stable free radical providing compound to terminate the copolymer and form the functional polymer.

2. The method of claim 1, wherein the functional polymer has a molecular weight of less than 150,000.

3. The method of claim 1, wherein the step of forming the copolymer includes:

polymerizing a vinyl aromatic monomer to form a third polymer block of the functional polymer, the first polymer block being intermediate to the second and third polymer blocks.

4. The method of claim 1, wherein the Mooney viscosity comprises up to 150 ML(1+4).

5. The method of claim 1, wherein the diene monomer includes butadiene and the vinyl aromatic monomer includes styrene.

6. The method of claim 1, wherein the stable free radical providing compound comprises a nitroxyl ether.

7. The method of claim 6, wherein a free radical which may be produced from the stable free radical providing compound comprises a nitroxy free radical.

8. The method of claim 6, wherein the stable free radical providing compound comprises a nitroxyl ether with an epoxide functional group.

9. The method of claim 8, wherein the nitroxyl ether with an epoxide functional group is selected from the group consisting of:

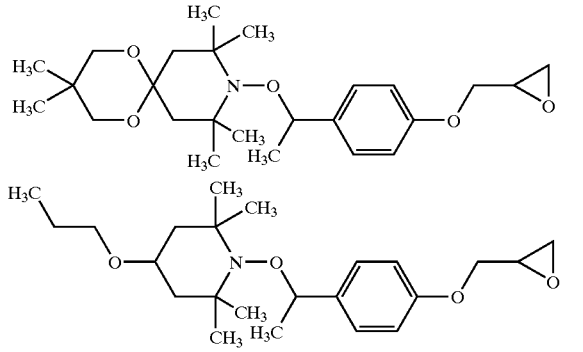

and

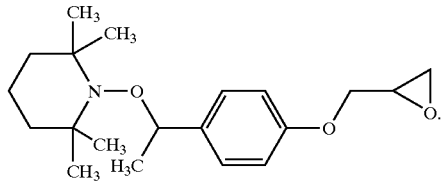

10. The method of claim 1, wherein the first polymer block has a weight average molecular weight of less than 100,000.

11. The method of claim 1, wherein all vinyl aromatic polymer blocks constitute from 2% to 80% by weight of the functional polymer.

12. The method of claim 11, wherein the copolymer is a diblock and the vinyl aromatic polymer block constitutes from 3 to about 40% by weight of the functional polymer.

13. The method of claim 1, wherein the second block is a tapered block in which a proportion of diene decreases from an end of the block adjacent the first block.

14. The method of claim 3, wherein the copolymer is a triblock and the vinyl aromatic monomer constitutes from 30 to about 70% by weight of the functional polymer.

15. A method of forming a functional polymer having at least one substituent capable of forming a stable free radical upon heating comprising:

forming a copolymer including:
polymerizing a diene monomer to form a first polymer block of the functional polymer, the first polymer block having a weight average molecular weight of less than 150,000;
polymerizing a vinyl aromatic monomer to form at least a second polymer block of the functional polymer, vinyl aromatic monomers comprising from 3–80% by weight of the monomers employed to form the copolymer; and contacting the copolymer with a stable free radical providing compound to form the functional polymer, the stable free radical providing compound reacting with the copolymer via an epoxide functional group of the stable free radical providing compound, the epoxide functional group serving as a terminator for the copolymer.

* * * * *